(12) United States Patent
Higuchi et al.

(10) Patent No.: US 7,119,142 B2
(45) Date of Patent: Oct. 10, 2006

(54) PREPARATION OF A CONDUCTIVE LIQUID SILICONE RUBBER COMPOSITION

(76) Inventors: Kazuo Higuchi, 1083-15, Aoyagi, Ichihara-shi, Chiba Prefecture (JP); Hidetoshi Kurusu, 1-6-1, Shiinokidai, Ichihara-shi, Chiba Prefecture (JP); Akito Nakamura, 3-7-13, Chiharadai Minami, Ichihara-shi, Chiba Prefecture (JP)

( * ) Notice: Subject to any disclaimer, the term of this patent is extended or adjusted under 35 U.S.C. 154(b) by 27 days.

(21) Appl. No.: 10/484,330

(22) PCT Filed: Aug. 21, 2002

(86) PCT No.: PCT/JP02/08440

§ 371 (c)(1),
(2), (4) Date: Feb. 18, 2004

(87) PCT Pub. No.: WO03/017289

PCT Pub. Date: Feb. 27, 2003

(65) Prior Publication Data

US 2004/0138370 A1    Jul. 15, 2004

(30) Foreign Application Priority Data

Aug. 21, 2001  (JP) .............................. 2001-249709

(51) Int. Cl.
*C08L 83/00* (2006.01)

(52) U.S. Cl. ..................... 524/588; 524/424; 524/430; 524/431; 524/440; 525/477; 525/479; 528/15; 528/31; 528/32

(58) Field of Classification Search ................. 528/15, 528/31, 32; 524/424, 430, 433, 440, 441, 524/588; 525/477, 479
See application file for complete search history.

(56) References Cited

U.S. PATENT DOCUMENTS

| 5,688,862 A | 11/1997 | Kondou |
| 5,984,849 A * | 11/1999 | Ohki et al. .................... 492/56 |

FOREIGN PATENT DOCUMENTS

| DE | 19727526 | 1/1999 |
| EP | 0434396 | 6/1991 |
| EP | 1039480 | 9/2000 |

* cited by examiner

*Primary Examiner*—Marc S. Zimmer
(74) *Attorney, Agent, or Firm*—Robert L. McKellar; McKellar IP Law, PLLC

(57) ABSTRACT

A method for producing a conductive liquid silicone rubber composition having an excellent storage stability and suitable for molding a conductive silicone rubber article with an arbitrary speed of curing and with good reproducibility of arbitrarily selected hardness and volume resistivity. The method comprises mixing component (A) which is a mixture of a conductive filler with a liquid diorganopolysiloxane having two or more silicon-bonded alkenyl groups in one molecule, component (B) which is a mixture of a conductive filler with a liquid diorganopolysiloxane having two or more silicon-bonded alkenyl groups in one molecule and a volume resistivity different from that of (A), component (C) a platinum-based catalyst; and component (D) which is a cross-linker that comprises an organopolysiloxane having two or more silicon-bonded hydrogen atoms in one molecule.

17 Claims, No Drawings

PREPARATION OF A CONDUCTIVE LIQUID SILICONE RUBBER COMPOSITION

The present invention relates to method for the preparation of a conductive liquid silicone rubber composition with a stable, easily reproducible, and selectively obtained volume resistivity, articles made from the resulting composition, and to a method of manufacturing said articles.

Due to their good workability, conductive silicone rubber compositions comprising addition-curable liquid silicone compositions containing conductive fillers such as carbon black, metal powder, conductive metal oxides, or the like are widely used in a variety practical applications, including forming parts of electrophotographic machines such as photocopiers, printers, plain-paper facsimile machines, charging rollers, developing rollers, image-transfer rollers, and fixation rollers.

Volume resistivity which is also known as the electrical resistivity, or specific resistance, $\rho$, is defined as the electrical resistance between the opposite faces of 1 $m^3$ of a material. It is important in all of the above applications to obtain formed articles having reproducible and permanent volume resistivity values within a predetermined range. However, when the value of volume resistivity is relatively high, e.g., within the range from $10^6$ Ohm·cm to $10^{12}$ Ohm·cm, it is not easy to form articles which have accurately reproducible and arbitrarily chosen volume resistivity values. Furthermore, the range of volume resistivities that may be required for the parts of office automation equipment significantly varies, depending on the types of the machines and parts themselves. Therefore there is a demand for a method that in a simple manner would enable the adjustment of volume resistivity of conductive silicone rubber compositions being cured into formed articles.

It was proposed in Japanese Patent Application Publication (hereinafter referred to as "Kokai") H8-208995 that a composition with a stable reproducibility of volume resistivity in a predetermined range can be obtained by combining an addition-curable silicone rubber composition (i.e. curable by means of a hydrosilylation reaction) with 20 to 60 wt. % of a conductive substance comprising 1 to 10 wt. % of conductive carbon and 90 to 99 wt. % of a conductive filler other than conductive carbon with volume resistivity within the range from $10^1$ Ohm·cm to $10^8$ Ohm·cm. However, in order to obtain volume resistivities within different ranges using this composition it is necessary each time to prepare a different composition, which is not economically justifiable.

Japanese Kokai H3-190964 (equivalent to EP 0434396), discloses a method for preparing a rubber composition obtained by mixing a conductive silicone rubber composition A containing carbon black and an organopolysiloxane containing up to 95 mol % of methyl groups and a non-conductive silicone rubber composition B that contains an organopolysiloxane containing at least 98 mol % of methyl groups. Compositions having different resistivities are prepared by varying the ratio of the components (A) and (B). However, components (A) and (B) of the proposed composition have poor miscibility due to their differences in viscosity and incompatibility. Therefore articles formed from these compositions have poor reproducibility with significant scattering in the values of their volume resistivities, particularly if the components (A) and (B) are flowable liquid compositions.

Furthermore, an addition-curable conductive liquid silicone rubber composition containing a carbon black may have some storage problems resulting in the impairment of cure properties and/or lowering of the hardness of cured articles after long term storage. These are caused by some characteristics of carbon black such as absorption properties and the existence of both surface active groups and impurities. For instance, a platinum (Pt) based catalyst in a liquid silicone rubber composition may be inactivated by the absorption property of carbon black and/or its catalytic activity may be inhibited by carbon black impurities. Furthermore, a cross-linker for addition cure systems, typically an organopolysiloxane having silicone-bonded hydrogen in a liquid silicone rubber composition may gradually decompose due to the effect of the surface active groups and/or impurities of the carbon black.

As a result of a study aimed at the solution of the above problems the inventors arrived at the present invention. It is an object of the present invention to provide a process for the preparation of an addition-curable conductive liquid silicone rubber composition with an excellent long-term storage stability and an arbitrarily adjustable speed of curing. It is another object of the present invention to provide a method of manufacturing articles from the aforementioned conductive silicone rubber composition with easily adjustable values of hardness and volume resistivities in the articles. Still another object is to provide articles formed from the conductive silicone rubber composition by the above method.

In accordance with the present invention there is provided a method of manufacturing a conductive liquid silicone rubber composition comprising:

mixing the following components:
(A) a mixture of a conductive filler with a liquid diorganopolysiloxane having two or more silicon-bonded alkenyl groups in one molecule;
(B) a mixture of a conductive filler with a liquid diorganopolysiloxane having two or more silicon-bonded alkenyl groups in one molecule and a volume resistivity different from that of (A);
(C) a catalytic agent that comprises a platinum-based catalyst; and
(D) a cross-linker that comprises an organopolysiloxane having two or more silicon-bonded hydrogen atoms in one molecule;

wherein the volume resistivities of components (A) and (B) are in accordance with the following relationship $10 \leq R_a/R_b \leq 100000$, and wherein $10^3$ Ohm·cm $\leq R_a \leq 10^{13}$ Ohm·cm; $10^2$ Ohm·cm $\leq R_b \leq 10^{12}$ Ohm·cm) where $R_a$ is the volume resistivity of a formed article obtained by mixing component (A) with the components (C) and (D) with subsequent thermal curing of the mixture, and where $R_b$ is the volume resistivity of a formed article obtained by the same method from component (B).

Components (A) and (B) are both essential components of the composition made in accordance with the method of the present invention. They both comprise a liquid diorganopolysiloxane having at least two silicone-bonded alkenyl groups per molecule and one or more conductive fillers, which may be the same or different. Preferably each of components (A) and (B) are in a substantially liquid form having a viscosity of from 100 to 10,000,000 mPa·s, preferably of from 1000 to 2,000,000 mPa·s. In each case, if the viscosity is below the recommended lower limit, the composition will become difficult to handle and will be prone to the formation of excessive flash when molding a composition of the invention. If, on the other hand, the viscosity is higher than the upper recommended level, difficulties may occur in transporting the composition by a pump. Whilst not essential it may be preferable, particularly when using a static mixer in the method of the present invention for the viscosity of Component (B) to be between 70% and 130% of the viscosity of Component (A) and more preferably to be between 90% and 110% of the viscosity of Component (A).

The diorganopolysiloxane used in components (A) and (B) may be the same or different and has at least two silicon-bonded alkenyl groups per molecule and may be expressed by the following general formula:

$$R_xSiO_{(4-x)/2}$$

in which each R is the same or different and is a substituted or unsubstituted monovalent hydrocarbon group for example an alkyl group such as methyl, ethyl, propyl, isopropyl, butyl, pentyl or hexyl group; an alkenyl group such as vinyl, allyl, propenyl or hexenyl group, an aryl group such as phenyl or tolyl group; a halogenated alkyl group such as 3,3,3-trifluoropropyl, and 3-chloropropyl groups in the above formula, x is a number from 1.8 to 2.2. preferably the diorganopolysiloxanes having at least 2 alkenyl groups per molecule in components (A) and (B) have viscosities of from 100 to 1,000,000 mPa·s.

Preferably the diorganopolysiloxanes having at least 2 alkenyl groups per molecule in components (A) and (B) are substantially linear in structure although they may be partially-branched. Examples include one or more of:
a dimethylvinylsiloxy-terminated dimethylpolysiloxane,
a dimethylvinylsiloxy-terminated copolymer of methylvinylsiloxane and dimethylsiloxane,
a trimethylsiloxy-terminated copolymer of methylvinylsiloxane and dimethylsiloxane,
a dimethylvinylsiloxy-terminated copolymer of methylphenylsiloxane and dimethylsiloxane,
a dimethylvinylsiloxy-terminated copolymer of methylphenylsiloxane, methylvinylsiloxane, and dimethylsiloxane
a trimethylsiloxy-terminated copolymer of methylphenylsiloxane, methylvinylsiloxane, and dimethylsiloxane,
a dimethylvinylsiloxy-terminated copolymer of diphenylsiloxane and dimethylsiloxane,
a dimethylvinylsiloxy-terminated copolymer of diphenylsiloxane, methylvinylsiloxane, and dimethylsiloxane,
a dimethylvinylsiloxy-terminated copolymer of methyl (3,3, 3-trifluoropropyl) siloxane and dimethylsiloxane, and
a dimethylvinylsiloxy-terminated copolymer of methyl (3,3, 3-trifluoropropyl) siloxane, methylvinylsiloxane, and dimethylsiloxane.

The conductive fillers in components (A) and (B) may be the same or different and may comprise one or more of the following: carbon blacks; powders of metals such as silver, copper, iron, aluminum, etc. and or particles having cores of barium oxide, titanium oxide or the like coated with conductive materials. If necessary, the conductive fillers may be combined with various surface-active agents used as conductivity promoters. It is recommended that the conductive filler be used in an amount of from 1 to 100 parts by weight and preferably 2 to 70 parts by weight per 100 parts by weight of the liquid diorganopolysiloxane having at least 2 alkenyl groups per molecule in both components (A) and (B). If the conductive filler is used in an amount below the lower limit of the recommended range, the composition will not acquire sufficient conductivity, and if it is used in an amount exceeding the upper limit of the recommended range, either the composition will lose its flowability or the subsequently cured formed article will have a reduced physical strength.

Carbon black is the preferred conductive material as minimal quantities thereof are required to obtain excellent conductivity in the final cured product. Any suitable carbon black may be used, for example, the carbon black may be conventional carbon black which is traditionally used in the production of conductive rubber compositions. Alternatively however, carbon black having a pH of from 6 to 10, produced from low-sulphur raw materials can be used, provided that it does not affect curing of the composition of the invention. Whilst there are no special limitations with regard to the size of the particles, it is preferred that the average diameter of the carbon-black particles used in component (A) and/or (B) of the present invention be within the range of from 30 to 90 nm.

Examples of types of carbon black which may be used in the composition of the present invention include one or more of the following: acetylene black, conducting furnace black (CF), super conducting furnace black (SCF), extra conducting furnace black (XCF), conducting channel black (CC). Alternatively furnace black and channel black heat-treated at elevated temperatures of about 1,500° C. may be utilised. More particularly, the acetylene black may be Denka Acetylene Black manufactured by Denki Kagaku Co., Ltd., and/or Shawinigan Acetylene Black manufactured by Shawinigan Chemical Co., the conducting furnace black may be Continex CF manufactured by Continental Carbon Co. and/or Vulcan C manufactured by Cabot Corp., the super conducting furnace black may be Continex SCF manufactured by Continental Carbon Co. and/or Vulcan SC manufactured by Cabot Corp., the extra conducting furnace black may be Asahi HS-500 manufactured by Asahi Carbon Co., Ltd. and/or Vulcan XC-72 manufactured by Cabot Corp., and the conducting channel black may be Corax L manufactured by Degussa Co. Modified furnace blacks commercially available as Ketjen Black EC and Ketjen Black EC-600JD from Ketjen Black International may also be used.

When the liquid conductive silicone rubber composition is required to exhibit a relatively high electrical resistance, it is preferred that rather than using the aforementioned carbon blacks, a carbon black having a dibutyl phthalate (DBP) oil absorption of 100 cm³/100 g or less is used, either by itself or in combination with a carbon black as described above. This latter type of carbon black may be exemplified by RCF #5 and RCF #10 from Mitsubishi Kagaku Kabushiki Kaisha; Asahi #50 and Asahi Thermal from Asahi Carbon Kabushiki Kaisha; and Monarch 120, Black Pearls 120, and Black Pearls 130 from the Cabot Corporation.

When carbon black is used as the conductive filler, it is preferably present in the composition made by the method of the invention in an amount of from 1 to 30 weight %, preferably from 2 to 15 weight % of the composition of the present invention. If carbon black is used in an amount less than the lower limit of the recommended range, it would be difficult to obtain stable volume resistivity. If, on the other hand, the content of carbon black exceeds the upper limit of the range, the composition will have poor flowability.

The amount of conductive filler used in components (A) and (B) is determined in accordance with the following formula: $10 \leq R_a/R_b \leq 100000$ subject to the fact that: $10^3$ Ohm·cm $\leq R_a \leq 10^{13}$ Ohm·cm; and $10^2$ Ohm·cm $\leq R_b \leq 10^{12}$ Ohm·cm where $R_a$ is the volume resistivity of a formed article obtained by mixing component (A) with below-described components (C) and (D) with subsequent thermal curing of the mixture, and where $R_b$ is the volume resistivity of a formed article obtained by the same method from component (B). More preferably the amount of conductive filler used is defined by the following $10 \leq R_a/R_b \leq 1000$. Under conditions described above, by varying the ratio between components (A) and (B) one may adjust the volume resistivity of an article formed by thermally curing the conductive silicone rubber composition of the present invention, resulting in products having a stable volume resistivity across a wide range of values.

One or both of components (A) and (B) may optionally contain a reinforcing silica filler, for example one or more dry-process silicas such as fumed silica and/or wet-process silicas such as precipitated silica. The reinforcing silica filler may be untreated or may have been treated so as to have surface hydrophobicity with an organochlorosilane, an organoalkoxysilane, a hexaorganodisilazane, a dimethylhydroxysiloxy-terminated polydiorganosiloxane or a cyclopolydiorganosiloxane or a similar organosilicon compound. An untreated silica filler may be treated in situ in a production process of component (A) and/or component (B) by mixing an organopolysiloxane, an untreated filler, and a surface treatment agent as referenced above. Preferably the aforementioned silica has a BET specific surface area of 50 m²/g or more, more preferably 100 m²/g or more. When used silica should be used in an amount of from 1 to 65 parts by weight and more preferably 2 to 45 parts by weight per 100 parts by weight of the diorganopolysiloxane which has two or more silicon-bonded alkenyl groups in one molecule and is contained in the component (A) or (B) concerned.

The composition made in accordance with the method of the present invention may have other optional additives for example inorganic fillers (which may optionally have been hydrophobically treated as described above) such as baked silica, manganese carbonate, aluminum hydroxide, aluminum oxide, quartz powder, diatomaceous earth, aluminosilicate, calcium bicarbonate, calcium carbonate, magnesium oxide, calcium silicate and/or mica; pigments such as iron oxide and titanium dioxide; heat-resistant agents such as cerium oxide and/or cerium hydroxide and flame retarders such as manganese carbide, zinc carbonate and/or fumed titanium oxide.

Components (A) and (B) may be easily prepared by means of mixers for example batch mixers such as kneader-mixers, pressure kneader-mixers, Henshel mixers and Ross mixers; and continuous-action kneaders such as single-screw continuous-action kneaders or, double-screw continuous-action kneaders.

The platinum-based catalyst of component (C) may be represented by a fine platinum powder, platinum black, chloroplatinic acid, alcohol-modified chloroplatinic acid, a complex of an olefin and a chloroplatinic acid, a complex of a chloroplatinic acid and an alkenylsiloxane, or a thermoplastic resin powder that contains the aforementioned platinum-based catalysts. It is recommended that the platinum-based catalyst be used in the composition made in accordance with the method of the present invention in an amount such that metallic platinum would be present in an amount of from 0.1 to 500 ppm.

Addition-curing by means of a hydrosilylation reaction requires component (D) which is a cross-linker comprising an organopolysiloxane having at least two silicon-bonded hydrogen atoms per molecule and which silicon bonded hydrogen atoms react with the alkenyl groups in components A and/or B. Examples of component (D) include one or more of the following: a trimethylsiloxy-terminated polymethylhydrogensiloxane, a trimethylsiloxy-terminated copolymer of methylhydrogensiloxane and dimethylsiloxane, a dimethylhydrogen siloxy-terminated copolymer of methylhydrogensiloxane and dimethylsiloxane, a cyclic copolymer of methylhydrogensiloxane and dimethylsiloxane, a cyclic polymethyl hydrogensiloxane, an organopolysiloxane composed of siloxane units expressed by the formula $(CH_3)_3SiO_{1/2}$, siloxane units expressed by the formula $SiO_{4/2}$, siloxane units expressed by the formula $(CH_3)_2HSiO_{1/2}$, an organopolysiloxane composed of siloxane units expressed by the formula $(CH_3)_2HSiO_{1/2}$ and siloxane units expressed by the formula $CH_3SiO_{3/2}$, an organopolysiloxane composed of siloxane units expressed by the formula $(CH_3)_2HSiO_{1/2}$, siloxane units expressed by the formula $(CH_3)_2SiO_{2/2}$, and siloxane units expressed by the formula $SiH_3SiO_{3/2}$, a dimethylhydrogensiloxy-terminated polydimethylsiloxane, a dimethylhydrogensiloxy-terminated copolymer of methylphenylsiloxane and dimethylsiloxane, and/or a dimethylhydrogensiloxy-terminated copolymer of methyl (3,3,3-trifluoropropyl) siloxane and dimethylsiloxane.

Although there are no special restrictions with regard to viscosity of component (D) at 25° C., it is recommended that viscosity be within the range of from 2 to 100,000 mPa·s. Preferably component (D) is introduced in an amount such that the molar ratio of silicon-bonded hydrogen atoms contained in component (D) to the cumulative total number of alkenyl groups in the components (A) and (B) (i.e. A+B) is in the range of from 0.3:1 to 10:1.

If component (C) is merely a platinum-based catalyst, direct compounding with the other components may result in problems associated with the presence of extremely small amounts or the solid state of the catalyst. Also if component (D) is only an organopolysiloxane with two or more silicon-bonded hydrogen groups in one molecule, the compounding of component (D) with the other components may result in problems associated with the presence of small amounts or lower viscosity of component (D). To avoid such compounding difficulties, preferably component (C) and/or component (D) may be diluted with a diluent and as such is introduced into the method of the present invention in the form of a masterbatch. Such a diluent may comprise a liquid organopolysiloxane of the following average unit formula:

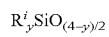

in which each $R^i$ may be the same or different and is an alkyl group such as methyl, ethyl, propyl, butyl, pentyl or hexyl; an alkenyl group such as vinyl, allyl, propenyl or hexenyl group; an aryl group such as phenyl or tolyl or a halogenated alkyl group such as 3,3,3-trifluoropropyl or 3-chloropropyl; in the above formula, y is a number from 1.8 to 2.2). The diluent may also contain one or more of the following reinforcing filler such as fumed silica, precipitated silica, baked silica and/or fumed titanium oxide; a non-reinforcing inorganic filler such as crushed quartz, diatomaceous earth, iron oxide, aluminum oxide, aluminosilicic acid and/or calcium carbonate, which fillers may optionally have been hydrophobically treated as described above.

In order to shorten the time required to reach uniformity in mixing components (A), (B), (C) and (D) and in order to make it possible to utilize a static mixer, it is recommended that a ratio of viscosity of component (C) to components (A) and (B), and Component (D) to components (A) and (B) be in the range from 0.1 to 1000, preferably from 1 to 100.

Curing retarders may also be used. These may include, for example, compounds such as alkyne alcohols, for example 3-methyl-1-butyn-3-ol, 3,5-dimethyl-1-hexyn-3-ol, 1-ethynyl-1-dichlorohexanol or phenyl butynol; enyne compounds for example 3-methyl-3-penten-1-yne and/or 3,5-dimethyl-3-hexen-1-yne; alkenyl-containing organopolysiloxanes for example 1,3,5,7-tetramethyl-1,3,5,7-tetravinyl cyclotetrasiloxane and/or 1,3,5,7-tetramethyl-1,3,5,7-tetrahexenyl cyclotetrasiloxane; and/or nitrogen-containing compounds such as benzotriazole and/or tetramethylethylene diamine.

The aforementioned curing retarders can be added to any of components (A), (B), (C) and (D), or can be used as independent components in the composition directly prior to forming. Compounding with component (D) is preferable.

The composition made by the method of the present invention may also optionally contain one or more polydiorganosiloxanes which are free from silicon-bonded alkenyl groups and silicon-bonded hydrogen atoms such as:
a trimethylsiloxy-terminated dimethylpolysiloxane,
a trimethylsiloxy-terminated copolymer of methylphenylsiloxane and dimethylsiloxane,
a trimethylsiloxy-terminated copolymer of diphenylsiloxane and dimethylsiloxane,
a trimethylsiloxy-terminated copolymer of methylphenylsiloxane and dimethylsiloxane and
a trimethylsiloxy-terminated copolymer of a methyl (3,3,3-trifluoropropyl) siloxane and dimethylsiloxane.

These may be used as the component (C) and/or (D) diluent as described above.

The composition according to the invention may also contain other additives, such as silicone rubber powder, silicone resin powder, and similar silicone powders, stearic acid, potassium stearate, zinc stearate, cerium stearate, or similar carboxylic acids or carboxylic acid metal salts, heat-resistant agents, flame retarders, pigments, adhesion promoters, etc. These additives can be premixed with any of components (A), (B), (C) or (D) or added to the composition as independent components directly prior to forming.

The liquid conductive silicone rubber composition made in accordance with the method of the present invention may be prepared using a mixing device such as a kneader-mixer, pressure kneader-mixer, Henshel mixer, Ross mixer, or a similar batch-type mixer; a single-axis continuous kneader, a biaxial continuous kneader and the like.

The method for forming an article from a conductive silicone rubber composition prepared in accordance with the method of the present invention may comprise the following steps:
i) loading each of components (A), (B), (C), and (D) in a separate tank
ii) continuously supplying each component at a predetermined rate from its respective tank into a mixing apparatus by means of, for example, one or more pumps connected to the respective tanks;
iii) mixing the composition in the mixing apparatus; and
iv) thermally curing the mixture.

The conductive silicone composition resulting from mixing step (iii) above may be in a substantially liquid or paste-like state, and there are no special limitations with regard to the mixing ratio, provided the components can be cured. However, preferably components (A) and (B) are used in a ratio of from 1:4 to 4:1, and that the ratio of the sum of components (A) and (B) to components (C) and (D) {(A)+(B):(C):(D)} is within the range of 100:1:1 to 5:1:1. Furthermore, the ratio of the sum of component (C) and component (D) to components (A) and (B) can be adjusted by main component-metering devices connected to respective two main component supply pumps, a catalyst-dosing device connected to the catalyst supply pump, and a cross-linker-dosing device connected to the cross-linker supply pump.

Preferably the continuous supply of each of components (A), (B), (C) and (D) is controlled by a dosing device such that the amount of any one component being introduced into the mixing apparatus may be varied at any time. This is particularly important in relation to components (A) and (B) because by varying the relative amounts present the resistivity of the final product may be varied as required.

The aforementioned mixing apparatus may comprise any suitable mixer such as a dynamic mixing apparatus for example a single-screw extruder, a dual-screw extruder, a two-roll mill, a kneader mixer or a static mixer.

A molding apparatus used for curing the conductive liquid silicone composition may comprise an injection molding machine, a compression molding machine, an extruder, a transfer molding machine, and a cast molding machine. Curing of the silicone composition of the invention in a die can be achieved by heating the composition at a temperature from 60° C. to 250° C., preferably from 80° C. to 220° C., for a period of time from 5 sec. to 1 hour.

In a further embodiment of the invention there is provided a silicone rubber composition comprising the following components:
(A) a mixture of a conductive filler with a liquid diorganopolysiloxane having two or more silicon-bonded alkenyl groups in one molecule;
(B) a mixture of a conductive filler with a liquid diorganopolysiloxane having two or more silicon-bonded alkenyl groups in one molecule and a volume resistivity different from that of (A);
(C) a catalytic agent that comprises a platinum-based catalyst; and
(D) a cross-linker that comprises a liquid organopolysiloxane having two or more silicon-bonded hydrogen atoms in one molecule;
wherein the volume resistivities of components (A) and (B) are in accordance with the following relationship $10 \leq R_a/R_b \leq 100000$, and wherein $10^3$ Ohm·cm $\leq R_a \leq 10^{13}$ Ohm·cm; $10^2$ Ohm·cm $\leq R_b \leq 10^{12}$ Ohm·cm) where $R_a$ is the volume resistivity of a formed article obtained by mixing component (A) with the components (C) and (D) with subsequent thermal curing of the mixture, and where $R_b$ is the volume resistivity of a formed article obtained by the same method from component (B).

In a still further embodiment of the present invention there is provided an article produced by the aforementioned method from the aforementioned conductive silicone rubber composition.

Since the method of the present invention for forming articles from the conductive silicone rubber composition of the present invention can be carried out at different composition curing speeds and can produce articles of different hardness and volume resistivity, that could be easily adjusted by merely changing the mixture ratio of the components, this method is especially suitable for effective production of articles with different volume sensitivities and hardnesses, such as rollers coated with a conductive silicone rubber, silicone rubber sheets, or the like.

Effects of the Invention

Since the conductive liquid silicone rubber composition prepared in accordance with the method of the present invention is prepared from components (A) through (D), this composition is characterized by a long service life and articles formed from this composition can be produced with arbitrarily selected and stable value of volume resistivity.

The method for forming articles from the conductive liquid silicone rubber composition of the present invention is characterized by high efficiency and by good reproducibility of hardness and volume resistivity in articles formed from the silicone rubber composition of the present invention. Another effect of the invention consists in the provision of conductive silicone rubber articles having a stable value of volume conductivity. Furthermore, articles formed and cured using a composition, made by the method in accordance with the present invention, which has been aged still gives good physical properties as will be seen from the accompanying examples.

The invention will be further described in detail with reference to practical and comparative examples. In these examples, all parts are parts by weight, and all viscosities have values measured at 25° C. by means of a rotary viscometer. Volume resistivity was measured by means of a commercially-produced resistivity tester (3222 PROGRAMMABLE Hi TESTER, from HIOKI EE Corp., and/or 4329 HIGH RESISTANCE METER from Yokogawa Hewlett-Packard (YHP) Co., Ltd.) on a 240 mm-long, 120 mm-wide, and 2 mm-thick conductive silicone rubber sheet formed by thermally curing each sample of the conductive liquid silicone rubber composition in a mold and sandwiched between 50 mm-diameter electrodes with application of a 100 g load. Ten sample silicone rubber sheets were formed and tested for each composition, and average, maximum, and minimum values were determined for each party of ten. Hardness (JIS type A) of each silicone rubber sheet was measured in compliance with the provisions of JIS K 6253.

EXAMPLE 1

Preparation of Component (A1)
Component (A1) was obtained by preparing a uniform mixture from:
100 parts of a 40,000 mPa·s viscosity trimethylsiloxy-terminated copolymer of methylvinylsiloxane and dimethylsiloxane (0.12 wt. % of vinyl groups),
33 parts of a quartz powder having a 5 μm average particle diameter, and
5.5 parts of furnace black having 75 nm average particle diameter and a DBP oil absorption amount of 70 cm$^3$/100 g.

Thereafter, 100 parts of component (A1) were uniformly mixed with 5 parts of component (C) catalyst masterbatch, the preparation of which is described below, and 5 parts of a component (D) cross-linker masterbatch, the preparation of which is described below. The resulting mixture was thermally cured using a metal mold in a compression molding machine having 490 kN (50 ton) clamping with a mold temperature of 150° C. for 5 min. heating. The resulting 240 mm-long, 120 mm-wide, and 2 mm-thick conductive silicone rubber sheet had a hardness equal to 20 and the following respective values of average, maximal, and minimal volume resistivities: $4\times10^{11}$, $8\times10^{11}$, and $2\times10^{11}$.

Preparation of Component (B1)
Component (B1) was obtained by preparing a uniform mixture from:
100 parts of a 40,000 mPa·s viscosity trimethylsiloxy-terminated copolymer of methylvinylsiloxane and dimethylsiloxane (0.12 wt. % of vinyl groups),
33 parts of a quartz powder having a 5 μm average particle diameter,
5.5 parts of furnace black having a 75 nm average particle diameter and a DBP oil absorption amount of 70 cm$^3$/100 g, and 3.3 parts of furnace black having a 40 nm average particle diameter and a dibutylphthalate (DBP) oil absorption amount of 160 cm$^3$/100 g.

Thereafter, 100 parts of component (B1) were uniformly mixed with 5 parts of component (C) catalyst masterbatch and 5 parts of a component (D) cross-linker masterbatch. The mixture was thermally cured using a metal mold in a compression molding machine having 490 kN (50 ton) clamping force with a mold temperature of 150° C. for 5 min. The obtained 240 mm-long, 120 mm-wide, and 2 mm-thick conductive silicone rubber sheet had a hardness equal to 21 and the following respective values of average, maximal, and minimal volume resistivities: $2\times10^7$, $3\times10^7$, and $1\times10^7$.

Preparation of Component (C); Catalyst Masterbatch
A catalyst masterbatch was prepared by uniformly mixing 100 parts of a 40,000 mPa·s viscosity trimethylsiloxy-terminated copolymer of methylvinylsiloxane and dimethylsiloxane (0.12 wt. % of vinyl groups) and 3.3 parts of a complex of platinum and a 1,3-divinyl-1,1,3,3-tetramethyl-disiloxane (concentration of platinum was 0.5 wt. %).

Preparation of Component (D); Cross-Linker Masterbatch
A cross-linker masterbatch was prepared by uniformly mixing 100 parts of a 40,000 mPa·s viscosity trimethylsiloxy-terminated copolymer of methylvinylsiloxane and dimethylsiloxane (0.12 wt. % of vinyl groups), 24 parts of a trimethylsiloxy-terminated copolymer of dimethylsiloxane and methylhydrogensiloxane represented by the following average molecular formula:

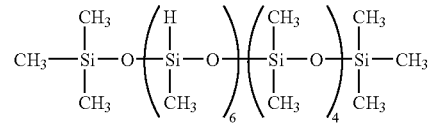

and 1.2 parts of a curing retarder in the form of a 1-ethynyl-1-cyclohexanol.

Formation of Silicone Rubber Sheet
The earlier prepared components (A1), (B1), (C) and (D) were uniformly mixed in the various mixture weight ratios shown in Table 1. The mixtures were then thermally cured for 5 min. in a compression molding machine having 490 kN (50 ton) clamping force at a mold temperature of 150° C. As a result conductive silicone rubber sheets having the dimensions 240 mm long, 120 mm wide, and 2 mm thick were obtained. Results of measurement of hardness and volume resistivity of the sheets are shown in Table 1.

Storage Stability
Silicone rubber sheets were prepared using the same methods and compositions, however components (A1), (B1), (C) and (D) were all aged for a period of one month at room temperature before use. Hardness and resistivity of the resulting sheets were measured and it was found that the results did not reveal a difference between the sheets formed directly after the preparation of the mixtures and after storing for one month at room temperature. The results are shown in Table 1.

COMPARATIVE EXAMPLE 1

50 parts of component (A1) and 50 parts of component (B1) were mixed, and a uniform mixture was prepared by combining the obtained mixture and uniformly mixing it with the following components:
100 parts of a 40,000 mPa·s viscosity trimethylsiloxy-terminated copolymer of methylvinylsiloxane and dimethylsiloxane (0.12 wt. % of vinyl groups) as used in Example 1,
30 parts of a quartz powder having a 5 μm average particle diameter,
1.5 parts of furnace black having a 40 nm average particle diameter and a DBP oil absorption amount of 160 cm³/100 g, and
5 parts of furnace black having a 75 nm average particle diameter and a DBP oil absorption amount of 70 cm³/100 g.

The mixture was further combined and uniformly mixed with 0.25 parts of a complex of platinum and a 1,3-divinyl-1,1,3,3-tetramethyldisiloxane (concentration of platinum was 0.5 wt. %) and 0.06 parts of a curing retarder in the form of 1-ethynyl-1-cyclohexanol.

After uniform mixing the resulting product was combined and mixed with 1.2 parts of a trimethylsiloxy-terminated copolymer of dimethylsiloxane and methylhydrogensiloxane represented by the following average molecular formula:

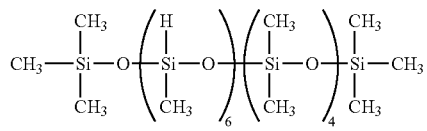

The composition was cured and formed into a silicone rubber sheet by the same method as in Example 1. The sheet was tested with regard to hardness and volume resistivity. Results of measurement are shown in Table 1.

COMPARATIVE EXAMPLE 2

Composition (X) was prepared by mixing 100 parts of component (B1) prepared in Example 1 with 5 parts of the component (C) prepared in Example 1. Composition (X) was then combined with 5 parts of component (D) prepared in Example 1, and silicone rubber sheets were formed from the obtained composition by the method of Example 1. The sheets were tested with regard to hardness and volume resistivity. In order to test the composition for storage stability, silicone rubber sheets were prepared by the same method as described above but after storing composition (X) for one month at room temperature. The results of measurement showed that composition (X) could not be cured at all, and that the catalyst of this composition lost its activity through the presence of the carbon black. The results are shown in Table 1.

COMPARATIVE EXAMPLE 3

Composition (Y) was prepared by mixing 100 parts of component (B1) prepared in Example 1 with 5 parts of component (D) prepared in Example 1. And composition (Y) was combined with 5 parts of component (C) prepared in Example 1. Silicone rubber sheets were formed from the obtained composition by the method of Example 1. The sheets were tested with regard to hardness and volume resistivity. In order to test the composition for storage stability, silicone rubber sheets were prepared by the same method as described above but after storing composition (Y) for one month at room temperature. Hardness and resistivity of the sheets were measured. The results of measurement showed that the hardness had a value lower than the initial hardness specified for JIS type A hardness, and organopolysiloxane having two or more silicon-bonded hydrogen atoms in one molecule was affected by the presence of the carbon black. The results are shown in Table 1.

TABLE 1

| Mix. ratio | Example 1 | | | Comp. Ex. 1 | Comp. Ex. 2 | Comp. Ex. 3 |
|---|---|---|---|---|---|---|
| Component (A1) | 75 | 50 | 25 | — | | |
| Component (B1) | 25 | 50 | 75 | — | | |
| Component (C) | 5 | 5 | 5 | — | | 5 |
| Component (D) | 5 | 5 | 5 | — | 5 | |
| Composition (X) | | | | | 105 | |
| Composition (Y) | | | | | | 105 |
| Results of test for samples made from compositions used directly after the preparation | | | | | | |
| Hardness (JIS type A) | 20 | 20 | 21 | 21 | 21 | 21 |
| Volume Resistivity (Ohm · cm) | | | | | | |
| Average | 2 × 10⁹ | 7 × 10⁸ | 8 × 10⁷ | 8 × 10⁸ | 2 × 10⁷ | 2 × 10⁷ |
| Maximum | 3 × 10⁹ | 8 × 10⁸ | 1 × 10⁸ | 5 × 10⁹ | 3 × 10⁷ | 3 × 10⁷ |
| Minimum | 8 × 10⁸ | 1 × 10⁸ | 5 × 10⁷ | 1 × 10⁸ | 1 × 10⁷ | 1 × 10⁷ |
| Results of test for samples made from compositions stored for 1 months after the preparation | | | | | | |
| Hardness (JIS type A) | 20 | 20 | 21 | — | Uncured | 15 |
| Volume Resistivity (Ohm · cm) | | | | | | |
| Average | 2 × 10⁹ | 6 × 10⁸ | 7 × 10⁷ | — | Uncured | 1 × 10⁷ |
| Maximum | 3 × 10⁹ | 8 × 10⁸ | 9 × 10⁷ | — | — | 3 × 10⁷ |
| Minimum | 9 × 10⁸ | 2 × 10⁸ | 4 × 10⁷ | — | — | 1 × 10⁷ |

EXAMPLE 2

Component (A1), component (B1), a catalyst, and cross-linker as defined in Example 1, were loaded into respective tanks and were fed by pumps connected to respective tanks via metering devices to a dynamic mixer, where they were uniformly mixed in various mixture weight ratios shown in below-given Table 2. The mixture was then supplied to an injection molding machine connected directly to the mixer and formed into 240 mm-long, 120 mm-wide, and 2 mm-thick conductive silicone rubber sheets. Results of measurement of hardness and volume resistivity of the sheets are shown in Table 2. In each aforementioned test, a portion of the conductive liquid silicone rubber composition was sampled through the outlet port of the mixer, and the speed of curing was measured by means of a V-type Curastometer. The results are shown in Table 2.

TABLE 2

| Mix. ratio (parts) | Example 2 | | | | |
|---|---|---|---|---|---|
| Component (A1) | 75 | 50 | 25 | 50 | 50 |
| Component (B1) | 25 | 50 | 75 | 50 | 50 |
| Component (C) | 5 | 5 | 5 | 7 | 5 |
| Component (D) | 5 | 5 | 5 | 5 | 7 |
| Hardness (JIS type A) | 20 | 20 | 20 | 20 | 25 |
| Induction time at 130° C. (sec.) | 30 | 30 | 30 | 24 | 37 |
| Volume Resistivity (Ohm · cm) | | | | | |
| Average | $2 \times 10^9$ | $5 \times 10^8$ | $7 \times 10^7$ | $5 \times 10^8$ | $1 \times 10^8$ |
| Maximum | $3 \times 10^9$ | $8 \times 10^8$ | $9 \times 10^7$ | $8 \times 10^8$ | $3 \times 10^8$ |
| Minimum | $7 \times 10^8$ | $1 \times 10^8$ | $3 \times 10^7$ | $1 \times 10^8$ | $8 \times 10^7$ |

EXAMPLE 3

Preparation of Component (A2)

Component (A2) was obtained by preparing a uniform mixture from:
100 parts of a 40,000 mPa·s viscosity trimethylsiloxy-terminated copolymer of a methylvinylsiloxane and a dimethylsiloxane (0.12 wt. % of vinyl groups),
33 parts of a quartz powder having a 5 μm average particle diameter, and
6.6 parts of furnace black having 75 nm average particle diameter and a DBP oil absorption amount of 70 cm$^3$/100 g.

Thereafter, 100 parts of component (A2) was uniformly mixed with 5 parts of the aforementioned catalyst and 5 parts of the aforementioned cross-linker. A 2 mm-thick sheet made by the method of Example 1 from the obtained conductive silicone rubber had a hardness of 20 and the following respective values of average, maximal, and minimal volume resistivities: $6 \times 10^{10}$, $8 \times 10^{10}$, and $2 \times 10^{10}$.

Preparation of Component (B2)

Component (B2) was obtained by preparing a uniform mixture from:
100 parts of a 40,000 mPa·s viscosity trimethylsiloxy-terminated copolymer of methylvinylsiloxane and dimethylsiloxane (0.12 wt. % of vinyl groups),
33 parts of a quartz powder having a 5 μm average particle diameter,
4.4 parts of Denka (Acetylene Black), and 6.6 parts of Furnace black having 75 nm average particle diameter and a DBP oil absorption amount of 70 cm$^3$/100 g.

Thereafter, 100 parts of component (B2) were uniformly mixed with 5 parts of the aforementioned catalyst and 5 parts of the aforementioned cross-linker. A 2 mm-thick sheet made by the method of Example 1 from the obtained conductive silicone rubber had a hardness of 20 and the following respective values of average, maximal, and minimal volume resistivities: $3 \times 10^6$, $3 \times 10^6$, and $1 \times 10^6$.

Formation of Silicone Rubber Sheet

Component (A2) and component (B2) were uniformly mixed with the cross-linker and the catalyst of Example 1 in a mixture weight ratio of 50:50:5:5. A 2 mm-thick sheet made by the method of Example 1 from the obtained conductive silicone rubber had a hardness of 20 and the following respective values of average, maximal, and minimal volume resistivities: $1 \times 10^7$, $3 \times 10^7$, and $7 \times 10^6$.

COMPARATIVE EXAMPLE 4

Preparation of Component (A3)

Component (A3) was obtained by preparing a uniform mixture from:
100 parts of a 40,000 mPa·s viscosity trimethylsiloxy-terminated copolymer of methylvinylsiloxane and dimethylsiloxane (0.12 wt. % of vinyl groups),
33 parts of a quartz powder having a 5 μm average particle diameter,
11 parts of furnace black having 75 nm average particle diameter and a DBP oil absorption amount of 70 cm$^3$/100 g, and 3.3 parts of furnace black having a 40 nm average particle diameter and a dibutylphthalate (DBP) oil absorption amount of 160 cm$^3$/100 g.

Thereafter, 100 parts of component (A3) were uniformly mixed with 5 parts of component (C) catalyst masterbatch prepared in Example 1 and 5 parts of a component (D) cross-linker masterbatch prepared in Example 1. The resulting mixture was thermally cured using a metal mould in a compression moulding machine having 490 kN (50 ton) clamping force with a mould temperature of 150° C. for 5 min. heating. The resulting 240 mm-long, 120 mm-wide, and 2 mm-thick conductive silicone rubber sheet had a hardness equal to 19 and the following respective values of average, maximal, and minimal volume resistivities: $6 \times 10^7$, $7 \times 10^7$, and $4 \times 10^7$.

Preparation of Component (B3)

Component (B3) was obtained by preparing a uniform mixture from:
100 parts of a 40,000 mPa·s viscosity trimethylsiloxy-terminated copolymer of methylvinylsiloxane and dimethylsiloxane (0.12 wt. % of vinyl groups),
33 parts of a quartz powder having a 5 μm average particle diameter, Formation of Silicone Rubber Sheet 50 parts of component (A3) 50 parts of component (B3), 5 parts of component (C), and 5 parts of component (D) were uniformly mixed and the mixtures were then thermally cured as in Example 1. The resulting 240 mm-long, 120 mm-wide, and 2 mm-thick conductive silicone rubber sheet had a hardness equal to 20 and the following respective values of average, maximal, and minimal volume resistivities: $4 \times 10^9$, $8 \times 10^8$, and $1 \times 10^{10}$. It will be noted that by using the above process poorer results are achieved despite the presence of a larger amount of carbon black in the composition than in the case of some of the examples herein.

What is claimed is:

1. A method of manufacturing a conductive liquid silicone rubber composition comprising mixing the following components:
   (A) a mixture of a conductive filler with a liquid diorganopolysiloxane having two or more silicon-bonded alkenyl groups in one molecule;
   (B) a mixture of a conductive filler with a liquid diorganopolysiloxane having two or more silicon-bonded alkenyl groups in one molecule and a volume resistivity different from that of (A);
   (C) a catalytic agent that comprises a platinum-based catalyst; and
   (D) a cross-linker that comprises an organopolysiloxane having two or more silicon-bonded hydrogen atoms in one molecule; wherein the volume resistivities of components (A) and (B) are in accordance with the following relationship $10 \leq R_a/R_b \leq 100000$, and wherein $10^3$ Ohm·cm $\leq R_a \leq 10^{13}$ Ohm·cm; $10^2$ Ohm·cm $\leq R_b \leq 10^{12}$ Ohm·cm ) wherein $R_a$ is the volume resistivity of a formed article obtained by mixing component (A) with the components (C) and (D) with subsequent thermal curing of the mixture, and wherein $R_b$ is the volume resistivity of a formed article obtained by the same method from component (B).

2. The method in accordance with claim 1 wherein the conductive fillers of components (A) and (B) both comprise the same or different non-metallic conductive filler having a volume resistivity below $10^3$ Ohm·cm.

3. The method in accordance with claim 2, wherein said conductive filler of a non-metal type is carbon black in an amount from 1 to 30 wt. %.

4. The method in accordance with claim 1, wherein volume resistivity of a cured body of said conductive liquid silicone rubber composition is within the range from $10^6$ Ohm·cm to $10^{12}$ Ohm·cm.

5. The method in accordance with claim 1, wherein the sum of amounts of components (C) and (D) is from 1 to 20 parts by weight for each 100 parts by weight of the sum of amounts of components (A) and (B).

6. The method in accordance with claim 1 wherein the method of mixing is a continuous process.

7. The method in accordance with claim 6 comprising continuously feeding metered amounts of each of components (A), (B), (C), and (D) to a mixing apparatus and mixing the composition to uniformity.

8. A method of manufacturing articles having a predetermined resistivity range by varying the amounts of components (A) and (B) entering into the mixing apparatus in the method of claim 7 and curing the mixture upon removal from said apparatus.

9. The method in accordance with claim 2, wherein the sum of amounts of components (C) and (D) is from 1 to 20 parts by weight for each 100 parts by weight of the sum of amounts of components (A) and (B).

10. The method in accordance with claim 2, wherein the sum of amounts of components (C) and (D) is from 1 to 20 parts by weight for each 100 parts by weight of the sum of amounts of components (A) and (B).

11. The method in accordance with claim 2 wherein the method of mixing is a continuous process.

12. The method in accordance with claim 3 wherein the method of mixing is a continuous process.

13. The method in accordance with claim 11 comprising continuously feeding metered amounts of each of components (A), (B), (C), and (D) to a mixing apparatus and mixing the composition to uniformity.

14. The method in accordance with claim 12 comprising continuously feeding metered amounts of each of components (A), (B), (C), and (D) to a mixing apparatus and mixing the composition to uniformity.

15. An article formed from the conductive liquid rubber composition obtained by the method as claimed in claim 8.

16. A method of manufacturing articles having a predetermined resistivity range by varying the ratios of components (A), (B), (C), and (D) entering into the mixing apparatus in the method of claim 7.

17. A four-part kit adapted to be used in the method according to claim 1 wherein:

component (A) is a mixture of a conductive filler with a liquid diorganopolysiloxane having two or more silicon-bonded alkenyl groups in one molecule;

component (B) is a mixture of a conductive filler with a liquid diorganopolysiloxane having two or more silicon-bonded alkenyl groups in one molecule and a volume resistivity different from that of (A);

component (C) is a catalytic agent that comprises a platinum-based catalyst; and component (D) is a cross-linker that comprises an organopolysiloxane having two or more silicon-bonded hydrogen atoms in one molecule; wherein the volume resistivities of components (A) and (B) are in accordance with the following relationship $10 \leq R_a/R_b \leq 100000$, and wherein $10^3$ Ohm·cm $\leq R_a \leq 10^{13}$ Ohm·cm; $10^2$ Ohm·cm $\leq R_b \leq 10^{12}$ Ohm·cm ) wherein $R_a$ is the volume resistivity of a formed article obtained by mixing component (A) with the components (C) and (D) with subsequent thermal curing of the mixture, and wherein $R_b$ is the volume resistivity of a formed article obtained by the same method from component (B).

* * * * *